(12) United States Patent
Kino et al.

(10) Patent No.: US 8,485,550 B2
(45) Date of Patent: Jul. 16, 2013

(54) AIRBAG

(75) Inventors: Masao Kino, Kiyosu (JP); Kikuyo Izoe, Kiyosu (JP); Takashi Iida, Kiyosu (JP); Eiji Sato, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/332,511

(22) Filed: Dec. 21, 2011

(65) Prior Publication Data

US 2012/0161425 A1 Jun. 28, 2012

(30) Foreign Application Priority Data

Dec. 28, 2010 (JP) ................................. 2010-292860

(51) Int. Cl.
*B60R 21/16* (2006.01)
(52) U.S. Cl.
USPC ..................................................... 280/730.2
(58) Field of Classification Search
USPC .............. 280/730.2, 730.1; 442/263; 156/60, 156/277, 330.9
See application file for complete search history.

(56) References Cited

U.S. PATENT DOCUMENTS

| 5,879,767 A * | 3/1999 | Matsushima et al. ........ 428/35.2 |
| 6,550,809 B1 * | 4/2003 | Masuda et al. ............. 280/743.1 |
| 6,971,674 B2 * | 12/2005 | Johansson ................. 280/743.1 |
| 2010/0078919 A1 * | 4/2010 | Naruse et al. ............. 280/728.2 |

FOREIGN PATENT DOCUMENTS

| JP | 10-129380 | | 5/1998 |
| JP | 2002145001 A | * | 5/2002 |
| JP | 2006159990 A | * | 6/2006 |
| JP | 2006327521 A | * | 12/2006 |
| JP | 2009-227164 | | 10/2009 |

* cited by examiner

*Primary Examiner* — Faye M. Fleming
(74) *Attorney, Agent, or Firm* — Posz Law Group, PLC

(57) ABSTRACT

In an airbag, an external wall composed of a flexible woven cloth is adhered and configured by extending a thick thread base cloth and a fine thread base cloth with threads of different thicknesses while performing heat pressing with a coating layer interposed between the thick thread base cloth and the fine thread base cloth. The coating layer is formed by applying a coating agent that forms the coating layer on the thick thread base cloth side in advance.

10 Claims, 10 Drawing Sheets

AIRBAG

CROSS REFERENCE TO RELATED APPLICATIONS

The present application claims priority from Japanese Patent Application No. 2010-292860 of Kino et al., filed on Dec. 28, 2010, the disclosure of which is hereby incorporated into the present application by reference.

BACKGROUND OF THE INVENTION

1. Field of the Invention

The present invention relates to an airbag made of flexible woven cloth with an external wall.

2. Description of Related Art

In the related art, as an airbag, there is that shown in Japanese Patent Unexamined Publication No. 10-129380. With such an airbag, a bag was made by respectively applying unvulcanized rubber, thermoplastic polyurethane, and the like that are a coating layer for preventing gas leakage over the entire surfaces of two base cloths that compose an external wall, and adhering the outer peripheries of each of the two base cloths by cure adhesion or heat sealing.

With such an airbag of the related art, the thickness of the thread that configures a base cloth is not specified. However, in case of adhering a thick thread base cloth to a fine thread base cloth with threads of different thicknesses, it is difficult to obtain a favorable adhesion strength. The reason is that the convexities and concavities on the adhesion faces of the two differ by the difference in the thicknesses of the threads. In particular, in case of adhering two base cloths by providing a coating layer on only one of the base cloths and fusing the coating layer by overlapping the other base cloth on the coating layer, it is difficult to obtain a favorable adhesion strength with base cloths with threads of different thicknesses. Therefore, in case that base cloths with threads of different thicknesses to each other are used, a coating layer is provided on only one of the base cloths, and the other base cloth is adhered, there was scope for improvement in raising the adhesion strength.

SUMMARY OF THE INVENTION

An object of the present invention is to provide an airbag that can configure an external wall while securing a favorable adhesion strength even while being configured to adhere base cloths with threads of different thicknesses to each other.

The object of the present invention can be achieved by an airbag of the configuration below.

An external wall composed of a flexible woven cloth is included, wherein the external wall is adhered and configured by extending a thick thread base cloth and a fine thread base cloth with threads of different thicknesses while performing heat pressing with a coating layer interposed between the thick thread base cloth and the fine thread base cloth, and the coating layer is formed by applying a coating agent that forms the coating layer on the thick base cloth side in advance.

DESCRIPTION OF THE PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
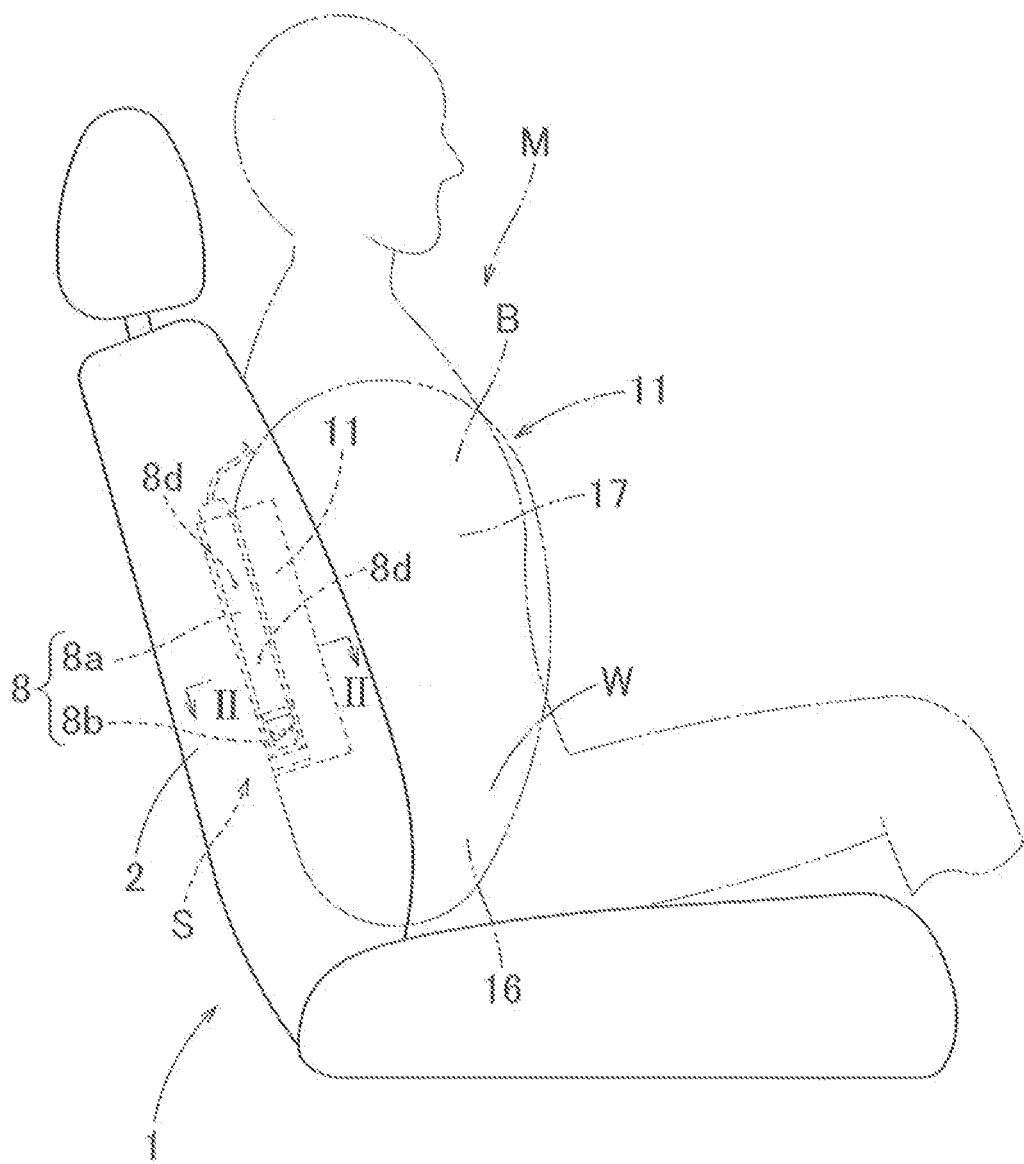
FIG. 1 is a side view of a seat which illustrates the vehicular installation state of a side airbag apparatus in which an airbag according to an embodiment of the present invention is used.
Figure 2:
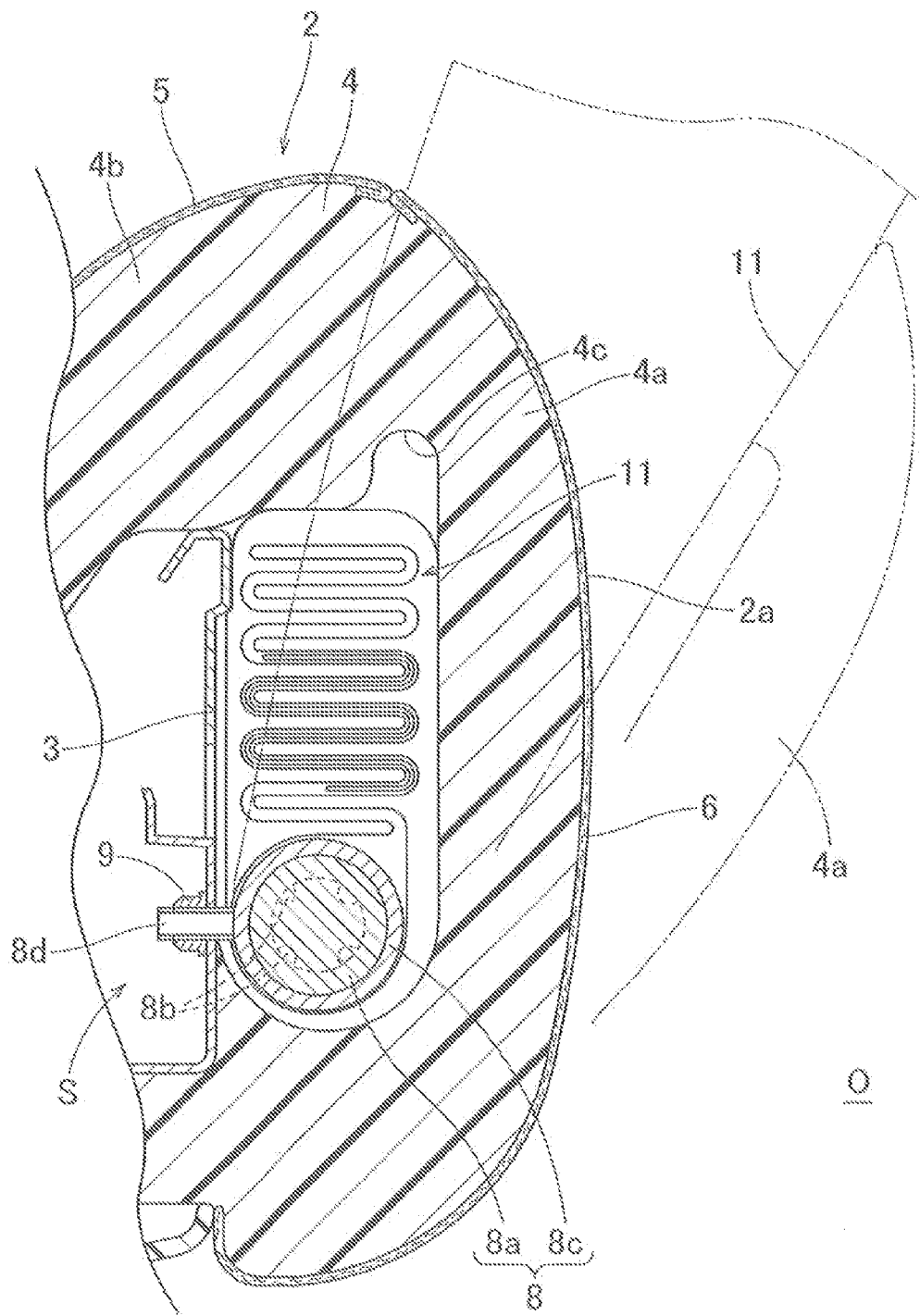
FIG. 2 is an outline horizontal cross-sectional diagram of an airbag apparatus that uses the airbag of the embodiment, and corresponds to the II-II region in FIG. 1.

An embodiment of the present invention will be described below based on the drawings. In the embodiment, an airbag 11 that is used in a side airbag apparatus S will be described as an example. As illustrated in FIGS. 1 and 2, the side airbag apparatus S is installed on a side face 2a on a vehicle outside O (in case of the embodiment, the right side) on a seat back 2 of a seat 1. Here, in the embodiment, unless specified otherwise, the up and down, forward and backward, and left and right directions match the up and down, forward and backward, and left and right directions of the vehicle.

As illustrated in FIG. 1, a seat frame 3 is arranged on the seat back 2 along substantially the up and down direction. The airbag apparatus S has a bolt 8d of an inflator 8 described later which is secured with a nut 9, and is fixed to the seat frame 3 of the seat back 2 (refer to FIG. 2). Further, as the members with numerals attached illustrated in FIG. 2, 4 is a cushion and 5 and 6 are skins composed of decorative cloth or the like. Furthermore, an edge portion 4a of the right side of the cushion 4 covers from the front side of the airbag apparatus S to the vehicle outside O. The edge portion 4a is pushed by the airbag 11 when the airbag 11 expands and separates from a center portion 4b of the cushion 4. Further, a concave portion 4c is provided on the cushion 4. The concave portion 4c is a region for fixing the separation position of the edge portion 4a from the center portion 4b when the airbag 11 expands.

The airbag apparatus S includes the airbag 11 and the inflator 8 that supplies the expansion gas to the airbag 11. The inflator 8 is inserted within the airbag 11.

The inflator 8 includes a substantially columnar main body 8a and a substantially cylindrical retainer 8c that interposes and retains the main body 8a. A gas discharge opening 8b that discharges the expansion gas is formed on the lower end side of the main body 8a. The bolts 8d that protrude to the seat frame 3 side are arranged on the retainer 8c. Each bolts 8d is secured to the seat frame 3 by the nuts 9 (refer to FIGS. 1 and 2). The bolts 8d are arranged on two locations that are separated above and below.

Figure 3:
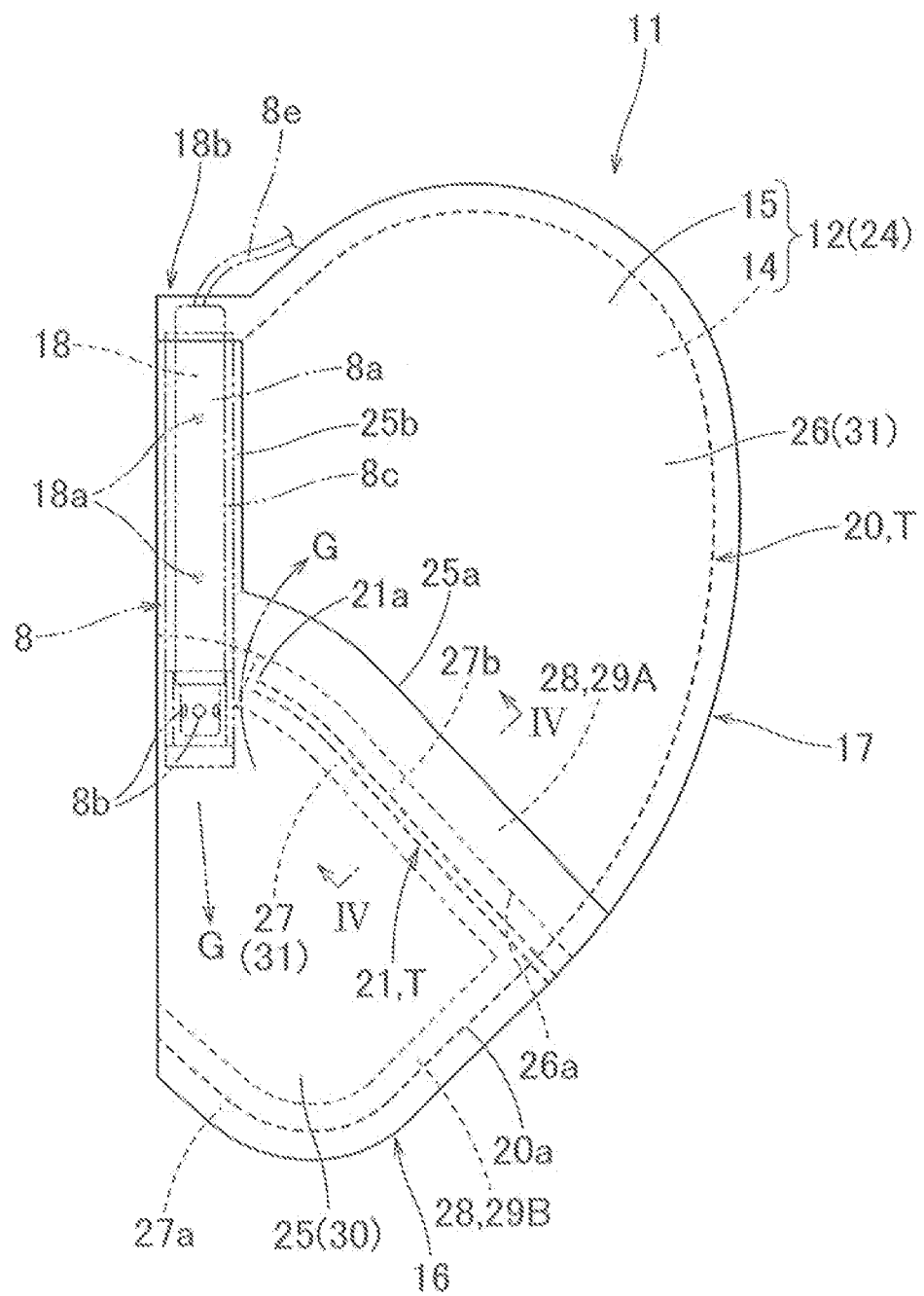
FIG. 3 is a front view of the airbag of the embodiment.
Figure 4:
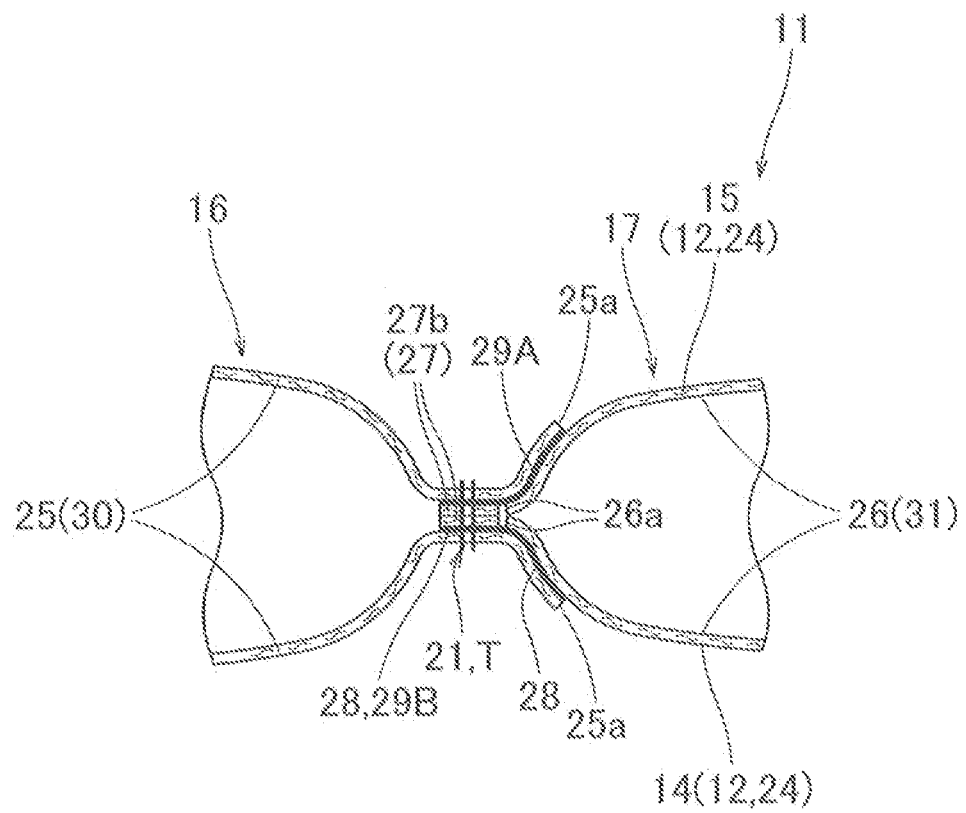
FIG. 4 is an outline cross-sectional diagram of the airbag of the embodiment, and corresponds to the IV-IV region in FIG. 3.

As illustrated in FIG. 1, the airbag 11 has a substantially elliptical plate shape in which the expansion completed face extends in the up and down direction. Specifically, the airbag 11 expands to protect a region from the lumbar region W to the chest region B of an occupant M seated on the seat 1. As illustrated in FIGS. 3 and 4, the airbag 11 includes a vehicle inside wall 14 that is arranged on the vehicle inside (seat back 2 side) when expansion is completed and a vehicle outside wall 15 that is arranged on the vehicle outside. Further, in case of the embodiment, with the airbag 11, the outer circumference ends of the vehicle inside wall 14 and the vehicle outside wall 15 are sewn (bonded) to each other to form a rim bonding portion 20 using a suture T. In case of the embodiment, the airbag 11 is configured by an airbag base cloth 24 (refer to FIG. 7A) with an outer appearance of coupling the vehicle inside wall 14 and the vehicle outside wall 15 on the posterior edge portion. Furthermore, the airbag 11 is formed by folding back the airbag base cloth 24 at the center and sewing the corresponding rims to each other using the suture T. That is, the rim bonding portion 20 that sews the outer rims of the vehicular inside wall 14 and the vehicle outside wall 15 to each other is formed over substantially the entirety of the airbag 11 with the exception of the posterior edge side when expansion is completed and an opening 18b for inserting the inflator 8 formed on the posterior upper end side.

Further, as illustrated in FIGS. 3 and 4, the airbag 11 includes a lumber protection portion 16 and a chest protection portion 17 arranged to the upper side of the lumber protection portion 16. The lumber protection portion 16 is a region that protects the lumbar region W of the occupant M when the airbag 11 is expanded completely. The chest protection portion 17 is a region that protects the chest region B of the occupant M when the airbag 11 is expanded completely. The region of the vehicle inside wall 14 in the vicinity of the back end of the chest protection portion 17 configures an attachment portion 18 that is attached to the seat frame 3 by the inflator 8. Two attachment holes 18a and 18a that protrude each of the bolts 8d of the inflator 8 are formed above and below in the attachment portion 18. Further, the opening 18b is formed on the posterior upper end side of the chest protection portion 17 that is the upper end side of the attachment portion 18. The inflator 8 is inserted in the opening 18b. Further, in case of the embodiment, the lumber protection portion 16 and the chest protection portion 17 are divided from each other by a dividing bonding portion 21. The dividing bonding portion 21 is formed to be extended from the rim bonding portion 20. In detail, the dividing bonding portion 21 is formed to be inclined to the back and upward when seen from the side. Furthermore, the distal end 21a of the dividing bonding portion 21 is positioned more to the upper side than the gas discharge opening 8b of the inflator 8 in a state of storing the inflator 8 on the inside of the airbag 11 (refer to FIG. 3). Further, a miniscule gap is formed between the distal end 21a of the dividing bonding portion 21 and the inflator 8. That is, with the airbag 11 of the embodiment, as illustrated in FIG. 3, an expansion gas G that is discharged from the gas discharge opening 8b of the inflator 8 first flows into the lumber protection portion 16 and expands the lumber protection portion 16. The expansion gas G then flows into the chest protection portion 17 through the gap between the distal end 21a of the dividing bonding portion 21 and the inflator 8 and expands the chest protection portion 17. Therefore, with the airbag 11 of the embodiment, at the beginning of the expansion of the airbag 11, the lumber protection portion 16 is rapidly expanded by the internal pressure increasing before the chest protection portion 17, then the chest protection portion 17 expands by allowing the expansion gas to flow within and lowering the internal pressure below that of the lumber protection portion 16.

Figure 5:
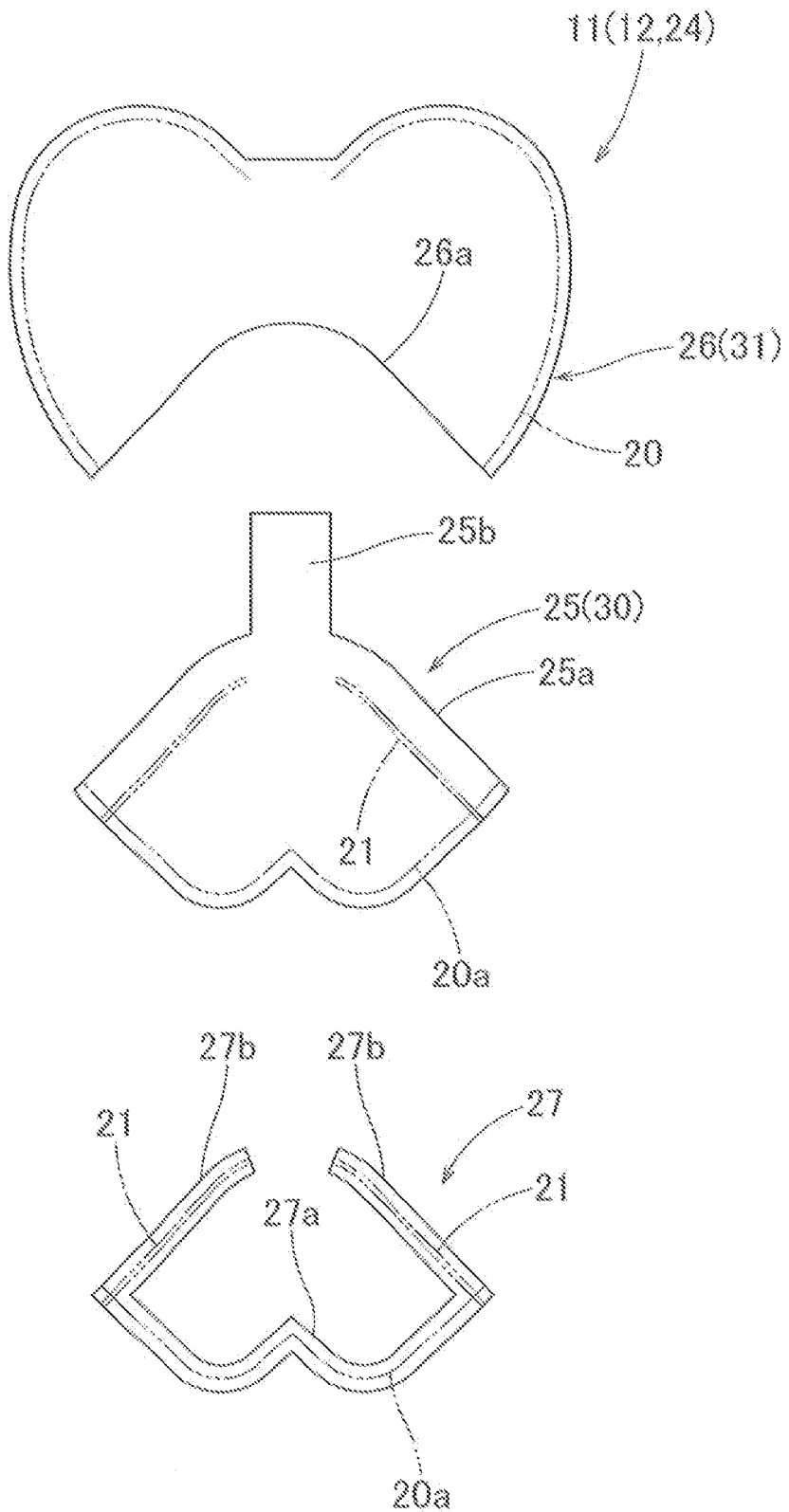
FIG. 5 is a plan view in which the base cloths that configure the airbag of the embodiment are lined up.

As described above, an external wall 12 (the vehicle inside wall 14 and the vehicle outside wall 15) of the airbag 11 is configured by the airbag base cloth 24. In case of the embodiment, the airbag base cloth 24 is configured to extend (range) a thick thread base cloth 30 and a fine thread base cloth 31 with threads of different thicknesses. With the airbag 11 of the embodiment, as illustrated in FIGS. 3 and 5, a lumbar region base cloth 25 that configures the region of the lumbar protection portion 16 where the internal pressure when expanded is high is configured by the thick thread base cloth 30 woven with a thick thread. Furthermore, a chest region base cloth 26 that configures the region of the chest protection portion 17 is configured by the fine thread base cloth 31 woven with a fine thread. Further, with the airbag 11 of the embodiment, a reinforcing cloth 27 that reinforces the dividing bonding portion 21 and a lower side region 20a of the rim bonding portion 20 is also configured by the fine thread base cloth 31. The lower side region 20a of the rim bonding portion 20 is the portion to the lower side of the dividing bonding portion 21.

In case of the embodiment, the thick thread base cloth 30 and the fine thread base cloth 31 are both formed by weaving a polyamide thread composed of a polyamide fiber by a plain weave. Specifically, a thread composed of nylon 66 synthetic thread of 470 dtex (423 denier) is used as the thick thread base cloth 30. Furthermore, a cover factor (K)=2173 (1200 to 2400) in which such a thread is woven by a plain weave (warp: 53 (40 to 80)/in, woof: 53 (40 to 80)/in) is used as the thick thread base cloth 30. A thread composed of nylon 66 synthetic thread of 350 dtex (315 denier) is used as the fine thread base cloth 31. Furthermore, a cover factor (K)=2098 (1200 to 2400) in which such a thread is woven by a plain weave (warp: 59 (40 to 80)/in, woof: 59 (40 to 80)/in) is used as the fine thread base cloth 31.

Here, in the embodiment, a thread composed of nylon 66 synthetic thread which is weaved by a plain weave is used as the airbag base cloth 24 (thick base cloth 30, fine base cloth 31). Other than nylon 66, aliphatic polyamides such as, for example, nylon 6, nylon 46, and nylon 12, aromatic polayamides (aramids) such as aramid, and the like are exemplified as the polyamide fiber (polyamide thread) used as the thread. Out of the above, it is preferable that nylon 66 be used from the viewpoints of heat resistance and versatility. Furthermore, as the thread, although differing by the type of polyamide fiber, a synthetic thread of between 200 and 700 dtex is usually used. Here, the form of the weave of the base cloth is not limited to plain weaving, and a base cloth woven by twill weaving, sateen weaving, or the like may be used.

Further, it is preferable that the cover factor (K) of the airbag base cloth 24 be within the range between 1200 and 2400. The cover factor (K) is calculated from the below calculation. That the cover factor (K) is low or high indicates that one or both of the thread density of the warp and the woof and the fineness of the warp and the woof are relatively low or high.

$$K = NW \times DW^{0.5} + NF \times DF^{0.5}$$

where NW: warp density (number/in), DW: warp fineness (denier)

NF: woof density (number/in), DF: woof fineness (denier)

If the cover factor (K) (one or both of thread density and fineness) is low at less than 1200, it is difficult for the airbag base cloth 24 to obtain a predetermined mechanical strength. Further, thread deviation may occur and there is a concern that the form of the weave pattern may be disturbed. Conversely, if the cover factor (K) (one or both of thread density and fineness) is high at greater than 2400, the rigidity of the airbag base cloth 24 is too high and the base cloth itself becomes thick. Therefore, the airbag 11 becomes prone to problems in the folding workability or storability thereof.

In case of the embodiment, the chest region base cloth 26 that configures the chest protection portion 17 configures a region that is approximately the upper half of the airbag base cloth 24. A lower border 26a of the chest region base cloth 26 is positioned to the upper side of the dividing bonding portion 21 and is adjacent to an upper side region 27b described later of the reinforcing cloth 27 (refer to FIGS. 3 and 4). The lumbar region base cloth 25 that configures the lumbar protection portion 16 configures a region that is approximately the lower half of the airbag base cloth 24. An upper border 25a of the lumbar region base cloth 25 is positioned to the upper side of the lower border 26a of the chest region base cloth 26. Further, the lumbar region base cloth 25 includes a protrusion portion 25b that configures the region of the attachment portion 18 in the vicinity of the center on the left and right. Furthermore, the lumbar region base cloth 25 includes a region that overlaps the chest region base cloth 26 over the entirety of the left and right (refer to FIG. 5). The reinforcing cloth 27 has a substantially belt shape along the lower side region 20a of the rim bonding portion 20 and the dividing bonding portion 21. In case of the embodiment, the reinforcing cloth 27 is formed over both the vehicle inside wall 14 side and the vehicle outside wall 15 side. To describe in detail, as illustrated in FIG. 5, the reinforcing cloth 27 includes a lower side region 27a and two upper side regions 27b and 27b that extend substantially in a straight line from both end sides of the lower side region 27a. The lower side region 27a is a region that has a substantially W shape and covers the entirety of the lower region side of the lumbar region base cloth 25 in a state of being unfolded to be flat. Each of the upper side regions 27b is a region that covers the region of the dividing bonding portion 21.

Furthermore, the airbag base cloth 24 of the embodiment connects the lumbar region base cloth 25 composed of the thick thread base cloth 30 and the chest region base cloth 26 composed of the fine thread base cloth 31 by interposing the coating layer 28 in a region in which the chest region base cloth 26 and the lumbar region base cloth 25 overlap each other and adhering the chest region base cloth 26 and the lumbar region base cloth 25 to each other by applying a heat process. A region that overlaps between the chest region base cloth 26 and the lumbar region base cloth 25 is the region between the lower border 26a of the chest region base cloth 26 and the upper border 25a of the lumbar region base cloth 25 in a state of overlapping each other while unfolded to be flat and the region of the protrusion portion 25b. Incidentally, with the airbag 11 of the embodiment, an adhesion region 29A that adheres the lumbar region base cloth 25 and the chest region base cloth 26 with the coating layer 28 interposed is formed only in the region of the chest protection portion 17 without straddling the dividing bonding portion 21. In other words, the lumbar region base cloth 25 and the chest region base cloth 26 are bonded to each other only by the adhesion to each other due to the coating layer 28 (adhesion region 29A) within the region of the chest protection portion 17 without sewing using a suture. In case of the embodiment, the adhesion region 29A is formed in a region that is approximately ⅓ (in detail, 950 cm²/2840 cm²) of the surface area of the chest protection portion 17 (sum of the surface areas of the regions of the chest protection portion 17 on the vehicle inside wall 14 and the vehicle outside wall 15).

Further, with the airbag base cloth 24 of the embodiment, the reinforcing cloth 27 is also adhered to the lumbar region base cloth 25 by interposing the coating layer 28 across the entire surface and performing heat pressing. That is, in the embodiment, the coating layer 28 is formed to connect the adhesion region 29A that adheres the lumbar region base cloth 25 and the chest region base cloth 26 with an adhesion region 29B that adheres the lumbar region base cloth 25 and the reinforcing cloth 27 (refer to FIG. 6B).

In case of the embodiment, the coating layer 28 is formed only on the lumber region base cloth 25 in which a region the chest region base cloth 26 or the reinforcing cloth 27 overlapped. In the embodiment, the coating layer 28 is formed of a polyamide-based elastomer (PA elastomer) that is recyclable along with the airbag base cloth 24. In case of the embodiment, the coating layer 28 is formed by applying a coating agent CM in which a block copolymerization type PA elastomer that is set so that the shearing strength (ASTM D638) is within a range between 3000 and 15000 MPa (preferably between 6000 and 12000 MPa), the fracture elongation (ASTM D638) is set to be equal to or greater than 200%, the flexural modulus (ASTM D790 (ISO 178)) is set to be equal to or less than 200 MPa, and the equilibrium coefficient of water absorption (ASTM 570: 20° C.×65% R) is set to be equal to or less than 2% which is made to be a dispersion liquid (emulsion) or a solution on the lumbar region base cloth 25. As the block copolymerization type PA elastomer, PEBA (PolyEther Block polyAmide) shown with the configuration below in which a polyamide (PA) block is the hard segment and a polyether (PE) block is the soft segment can be preferably used.

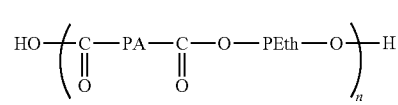

[Chem. 1]

As the polyether, polytetramethylene ether glycol, polypropylene glycol, and the like are exemplified. Further, the soft segment may be a polyester block such as aliphatic polyester diol.

With the airbag 11 of the embodiment, a commercially available product that is a PEBA in which the melting point (ASTM D3418) is set to 160° C., the searing strength (ASTM D638) is set to 9380 MPa, the fracture elongation (ASTM D638) is set to 450%, the flexural modulus (ASTM D790 (ISO 178)) is set to 84 MPa, and the equilibrium coefficient of water absorption (ASTM 570: 20° C.×65% R) is set to 1.2% is used as the PA elastomer.

Furthermore, in case of the embodiment, the coating layer 28 is formed by applying the coating agent CM composed of a dispersion liquid (emulsion) of the above PA elastomer by screen printing on one face (the adhesion face side and the inner circumference face when expansion is complete) of the lumbar region base cloth 25. Here, the particle diameter of the PA elastomer that is dispersed in the emulsion is usually set to between 0.05 and 5 μm (preferably between 0.2 and 5 μm, still preferably between 0.2 and 1 μm). Further, the application amount (dry weight standard) of the PA elastomer is set to between 20 and 100 g/m² (preferably between 30 and 80 g/m²). With an application amount of less than 20 g/m², it is hard to obtain favorable adhesion characteristics between the lumbar region base cloth 25 and the chest region base cloth 26 or the reinforcing cloth 27. Conversely, if the application amount exceeds 100 g/m², the coating layer 28 becomes too thick, the adhesion region becomes hard, and the folding workability of folding the airbag 11 to be compact for storage is not favorable. With the airbag base cloth 24 of the embodiment, the application amount of the PA elastomer that forms the coating layer 28 is set to 40 g/m².

Here, the formation method of the coating layer 28 is not limited to screen printing. The coating layer may be formed by knife coating (die coating), comma coating, reverse coating, or the like. However, in case of the embodiment, since the coating layer 28 is partially formed on the lumbar region base cloth 25, it is preferable that the coating layer 28 be formed by screen printing.

In addition, in the embodiment, the airbag base cloth 24 is formed as below. The reinforcing cloth 27 and the chest region base cloth 26 are respectively overlapped on the lumbar region base cloth 25 on which the coating layer 28 is applied. The lumbar region base cloth 25, the reinforcing cloth 27, and the chest region base cloth 26 are then adhered by melting the coating layer 28 by being pressed by a heating plate that has been heated to 180° C. for one minute with a pressure 20 MPa. The airbag base cloth 24 is thus formed.

Figure 6A:
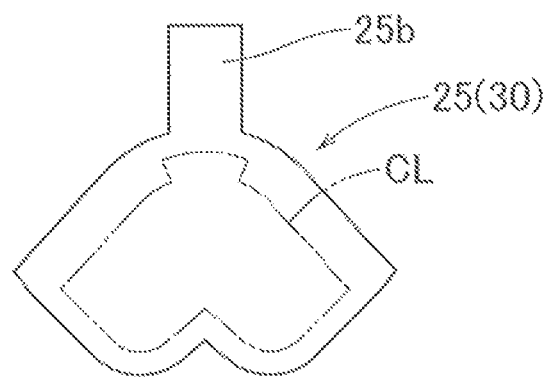
FIGS. 6A and 6B are diagrams that describe a manufacturing process of the airbag of the embodiment.
Figure 6A:
Figure 6B:
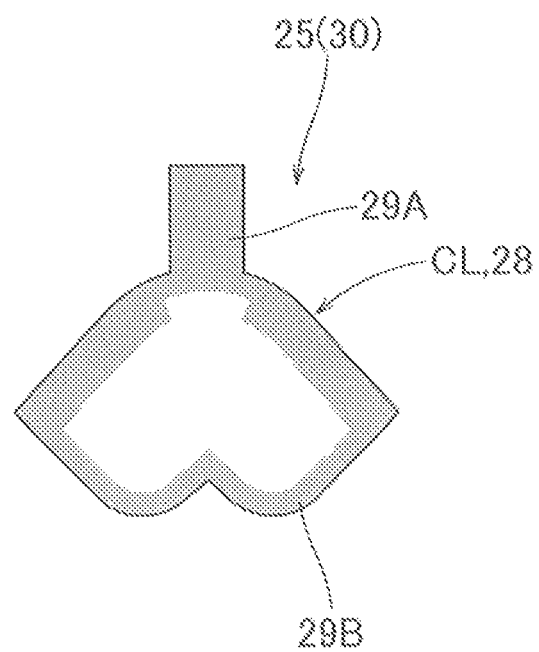
Figure 7A:
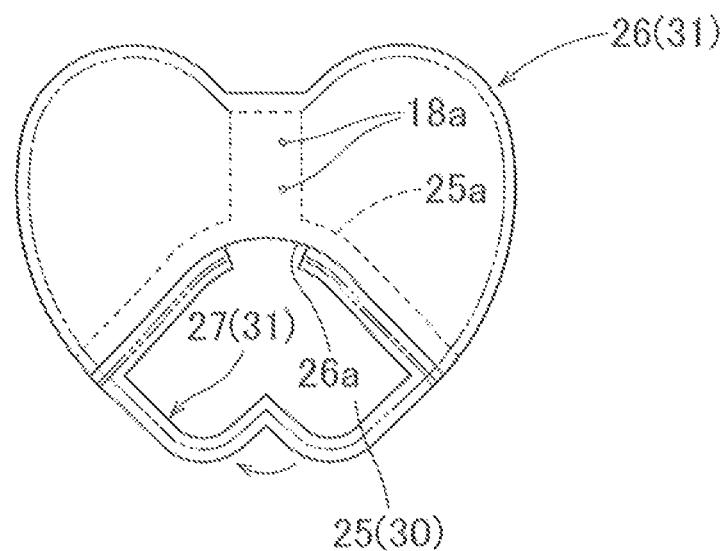
FIGS. 7A and 7B are diagrams that describe a manufacturing process of the airbag of the embodiment, and illustrate the process after that of FIGS. 6A and 6B.
Figure 7A:

Next, the manufacture of the airbag 11 of the embodiment will be described. The lumbar region base cloth 25 is prepared by cutting a thick thread base cloth material in advance. Further, the chest region base cloth 26 and the reinforcing cloth 27 are prepared by cutting a fine thread base cloth material. Furthermore, as illustrated in FIGS. 6A and 6B, the coating layer 28 is formed by applying the coating agent CM in the area on the inner circumference face of the lumbar region base cloth 25 by screen printing and drying the coating agent CM. Next, as illustrated in FIG. 7A, the chest region base cloth 26 and the reinforcing cloth 27 are adhered to the lumbar region base cloth 25 by respectively overlapping the chest region base cloth 26 and the reinforcing cloth 27 on the lumbar region base cloth 25 so as to cover the coating layer 28 and performing heat pressing. Specifically, the lumbar region base cloth 25 on the upper face side of which is arranged the coating layer 28 is placed on a support table of a heat press (not shown), and the chest region base cloth 26 and the reinforcing cloth 27 are respectively overlapped on the lumbar region base cloth 25 from above so as to cover the coating layer 28. Furthermore, the coating layer 28 is melted by pressing a heating plate that is heated to 180° C. from above and pressing with a pressure of 20 MPa for one minute on regions in which the lumbar region base cloth 25 and the chest region base cloth 26, and the lumbar region base cloth 25 and the reinforcing cloth 27 are respectively overlapping. The airbag base cloth 24 is then formed by respectively adhering the lumbar region base cloth 25, the reinforcing cloth 27, and the chest region base cloth 26.

Figure 7B:
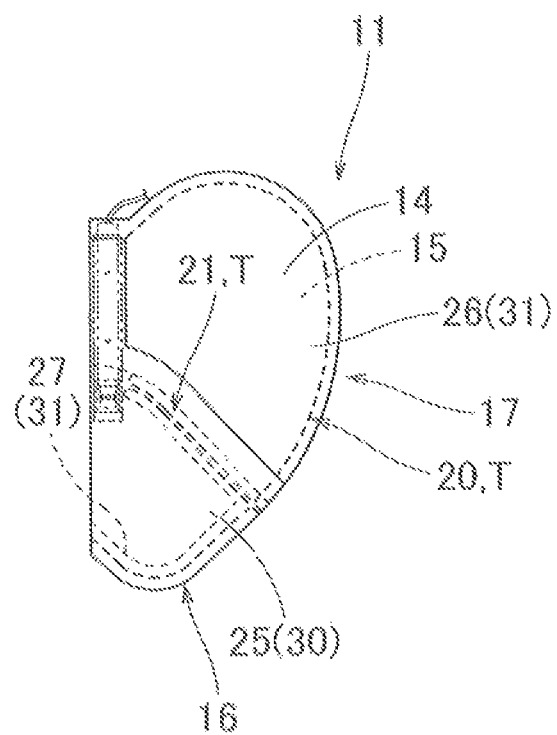

The airbag base cloth 24 is then folded in two and is sewn using a suture to form the rim bonding portion 20 and the dividing joining portion 21. As a result, the airbag 11 can be manufactured as illustrated in FIG. 7B. Furthermore, the inflator 8 is inserted into the airbag 11 manufactured in such a way via the opening 18b. At this time, the bolts 8d of the inflator 8 protrude from the attachment holes 18a and the region on the upper end side of the main body 8a of the inflator 8 protrudes from the opening 18b. The airbag 11 is then folded. If the bolts 8d and 8d of the inflator 8 which protrude from the folded airbag 11 are secured to the seat frame 3 by the nuts 9, it is possible to attach the airbag apparatus S to the seat back 2 of the seat 1. After the airbag apparatus S is attached, the assembly of the seat 1 is completed by attaching the cushion 4, the skins 5, 6, and the like, and the seat 1 is mounted in the vehicle. Further, when mounting the seat 1 in the vehicle, a harness 8e that extends from the main body 8a of the inflator 8 is wire connected to a predetermined airbag activation circuit of the vehicle.

After the airbag apparatus S in installed in the vehicle, if a predetermined signal is input to the main body 8a of the inflator 8 through the harness 8e, the expansion gas is discharged from the gas discharge opening 8b. Furthermore, as illustrated by the double dotted chained line of FIG. 2, the airbag 11 is pushed open by the edge portion 4a of the cushion 4 being separated from the center portion 4b, and as illustrated by the double dotted chain line of FIG. 1, the airbag 11 being expanded to become large.

Furthermore, with the airbag 11 of the airbag apparatus S of the embodiment, the airbag base cloth 24 that configures the external wall 12 is formed by connected (ranged) the lumbar region base cloth 25 composed of the thick thread base cloth 30 and the chest region base cloth 26 composed of the fine thread base cloth 31 with thicknesses that are different. The lumbar region base cloth 25 and the chest region base cloth 26 are connected (extended) in a state of being adhered by interposing the coating layer 28 therebetween and performing heat pressing.

However, with the airbag 11 of the airbag apparatus S of the embodiment, the coating layer 28 is formed on the lumbar region base cloth 25 by the coating agent CM that forms the coating layer 28 being applied on the lumbar region base cloth 25 side composed of the thick thread base cloth 30. It is therefore possible to maintain a favorable adhesion strength between lumbar region base cloth 25 and the chest region base cloth 26. As a result, even base cloths with threads of different thicknesses (thick thread base cloth 30, fine thread base cloth 31) can be adhered to each other with higher adhesion strengths.

Figure 8:
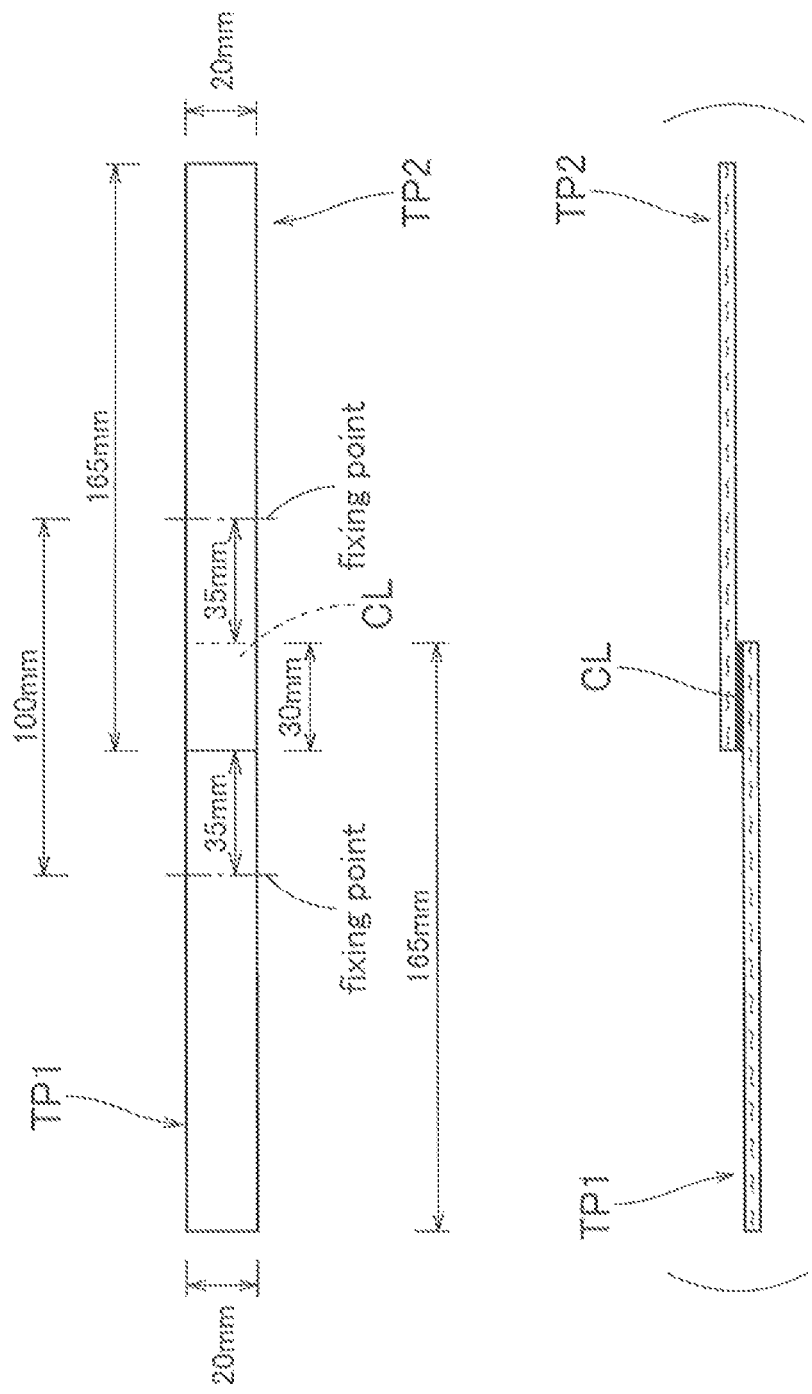
FIG. 8 is an outline diagram of a test specimen in which the shearing strength of an airbag base cloth is measured.

The result of an experiment of measuring the shearing strengths of airbag base cloths that are adhered to each other with a coating layer interposed therebetween will be described below. As illustrated in FIG. 8, the experiment is conducted using two belt-like test specimens TP1 and TP2 in which the widths are set to 20 mm and the lengths are set to 165 mm. Specifically, a coating layer CL with a length of 30 mm is formed on the end edge side of one of the test specimens TP1 and TP2 by applying a coating agent. The end edges of the test specimens TP1 and TP2 are adhered to each other via the coating layer CL by overlapping the end edge of the other of the test specimens TP1 and TP2 on the coating layer CL and performing heat pressing. Furthermore, the experiment is conducted by the below method. Each of the test specimens TP1 and TP2 is respectively fixed by fixers to fixing points that are 35 mm away from the coating layer CL (in other words, the distance between the fixing points is 100 mm). The fixers are pulled at a speed of 50 mm/minute so that the fixers are separated from each other.

One of the test specimens TP1 is configured by the same base cloth as the thick thread base cloth 30 that configures the airbag 11 of the embodiment (cover factor (K)=2173 in which a thread composed of a nylon 66 synthetic thread of 470 dtex (423 denier) is woven by plain weaving (warp: 53/in, woof: 53/in). The other test specimen TP2 is configured by the same base cloth as the fine thread base cloth 31 that configures the airbag 11 of the embodiment (cover factor (K)=2098 in which a thread composed of a nylon 66 synthetic thread of 350 dtex (315 denier) is woven by plain weaving (warp: 59/in, woof: 59/in). Further, the coating layer CL uses a coating agent composed of an emulsion of a PA elastomer that configures the coating layer 28 of the airbag 11 of the embodiment (PEBA in which the melting point (ASTM D3418) is set to 160°, the shearing strength (ASTM D638) is set to 9380 MPa, the fracture elongation (ASTM D638) is set to 450%, the flexural modulus (ASTM D790 (ISO 178)) is set to 84 MPa, and the equilibrium coefficient of water absorption (ASTM 570: 20° C.×65% R) is set to 1.2%). The coating layer 28 is formed by applying the coating agent on the test specimen TP1 or the test specimen TP2 at 40 g/m². Further, the heat press condition is the same as that of the airbag 11 of the embodiment, and is performed by applying a pressure of 20 MPa at 80° C. for one minute.

Furthermore, in the present experiment, experiments were conducted relating to the four types of test specimens below.

1: Test specimens in which the test specimens TP1 and TP2 are adhered to each other by forming the coating layer CL on the test specimen TP1 composed of the thick thread base cloth, overlapping the test specimen TP2 that is composed of the fine thread base cloth on the coating layer CL, and performing heat pressing (Experiment Example 1)

2: Test specimens in which the test specimens TP1 and TP2 are adhered to each other by forming the coating layer CL on the test specimen TP2 composed of the fine thread base cloth, overlapping the test specimen TP1 that is composed of the thick thread base cloth on the coating layer CL, and performing heat pressing (Experiment Example 2)

3: Test specimens in which the test specimens TP2 and TP2 are adhered to each other using two test specimens TP2 composed of fine thread base cloths, forming the coating layer CL on one, overlapping the other, and performing heat pressing (Reference Example 1)

4: Test specimens in which the test specimens TP1 and TP1 are adhered to each other using two test specimens TP1 composed of thick thread base cloths, forming the coating layer CL on one, overlapping the other, and performing heat pressing (Reference Example 2).

As a result, the shearing strength (average value of three experiments) of Experiment Example 2 in which the coating layer is formed on the fine thread base cloth side was 420 N. On the other hand, the shearing strength (average value of three experiments) of Experiment Example 1 in which the coating layer is formed on the thick thread base cloth side was 563 N. That is, Experiment Example 1 had an increase in the shearing strength of approximately 34% in comparison to Experiment Example 2. Incidentally, the shearing strength (average value of three experiments) of Reference Example 1 in which the fine thread base cloths are adhered to each other was higher than in Experiment Example 1 at 711 N. Further, the shearing strength (average value of three experiments) of Reference Example 2 in which the thick thread base cloths are adhered to each other was lower than in Experiment Example 2 at 130 N.

Figure 9:
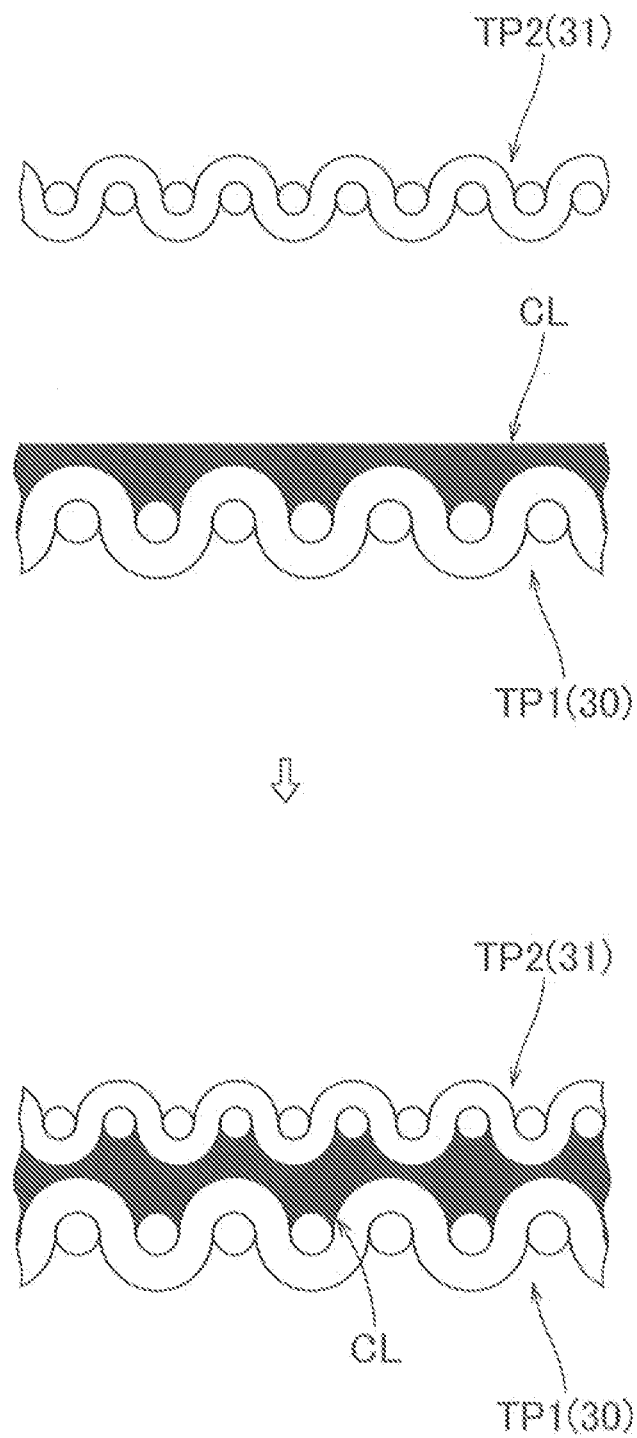
FIG. 9 is outline diagrams that describe the adhesion state of the thick thread base cloth with the fine thread base cloth.
Figure 10:
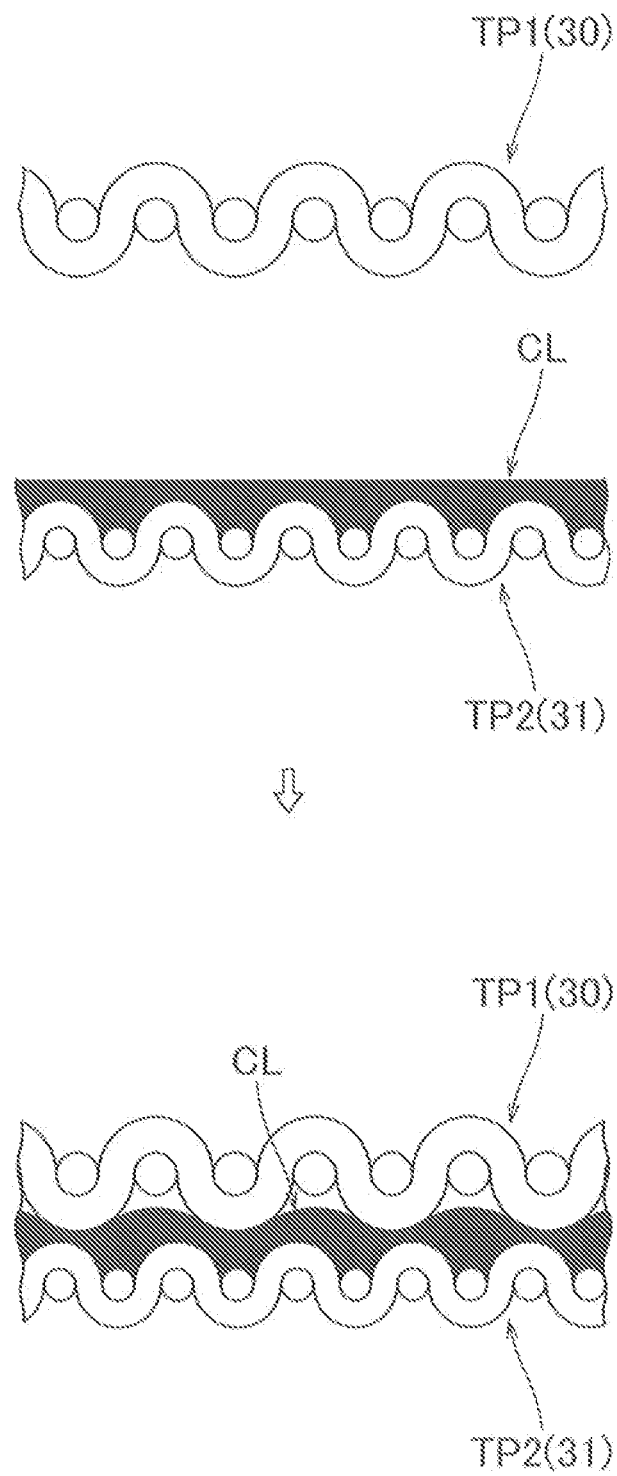
FIG. 10 is outline diagrams that describe the adhesion state of the thick thread base cloth with the fine thread base cloth.

Taking also the measurement results of Reference Examples 1 and 2 into account, it is presumed that the difference in shearing strengths between Experiment Examples 1 and 2 is due to the following reasons. As illustrated in FIG. 9, the thick thread base cloth 30 formed of a thick thread has greater surface concavities and convexities as compared to the fine thread base cloth 31 formed of a fine thread. However, in case that the coating layer CL is formed by applying the coating agent on the thick thread base cloth in advance, the coating layer is formed by the melted coating agent entering between the thread of the thick thread base cloth 30 with large convexities and concavities and flattening the surface that is the adhesion face side with the fine thread base cloth. Further, in case that the fine thread base cloth 31 overlaps and is heat pressed on the coating layer CL in which the surface is flat, since the surface concavities and convexities of the fine thread base cloth 31 are small compared to the thick thread base cloth 30, the melted coating agent easily infiltrates between the threads of the fine thread base cloth 31. It is therefore possible for the fine thread base cloth 31 to be closely adhered to the thick thread base cloth 30 via the coating layer CL (refer to FIG. 9). As an opposite pattern, in case of forming the coating layer CL by applying the coating agent on the fine thread base cloth 31 in advance, as illustrated in FIG. 10, the coating layer CL is similarly formed by causing the coating agent to infiltrate between the threads of the fine thread base cloth 31 and flattening the surface. Furthermore, if the thick thread base cloth 30 is overlapped and heat pressed on the coating layer CL in which the surface is flat, since the surface concavities and convexities of the thick thread base cloth 30 are great, it is difficult for the melted coating agent to infiltrate between the threads of the thick thread base cloth 30. As a result, it is difficult for the thick thread base cloth 30 to be closely adhered to the fine thread base cloth 31 via the coating layer CL (refer to FIG. 10).

With the airbag 11 of the embodiment, the airbag base cloth 24 that configures the external wall 12 is configured so that the thick thread base cloth 30 (lumbar region base cloth 25) and the fine thread base cloth 31 (chest region base cloth 26) with threads of different thicknesses are adhered and connected (ranged) in the region of the chest protection portion 17 by interposing the coating layer 28 therebetween and applying a heat process. Furthermore, with the airbag 11 of the embodiment, the coating layer 28 is formed by applying the coating agent CM on the thick thread base cloth 30 (lumbar region base cloth 25) side in advance. It is therefore possible to adhere the lumbar region base cloth 25 to the chest region base cloth 26 by the coating layer 28 with a favorable adhesion strength. As a result, even if tension acts on the vehicle inside wall 14 and the vehicle outside wall 15 (external wall 12) that configure the chest protection portion 17 when the airbag 11 expands, the lumbar region base cloth 25 and the chest region base cloth 26 can be prevented from deviating to shear the coating layer 28. Further, it is possible to maintain a favorable adhesion state between the lumbar region base cloth 25 and the chest region base cloth 26. As a result, even if the airbag 11 of the embodiment has a configuration of bonding the lumbar region base cloth 25 and the chest region base cloth 26 only by the adhesion due to the coating layer 28 within the region of the chest protection portion 17, it is possible to maintain a favorable bonding state (adhesion state) between the lumbar region base cloth 25 and the chest region base cloth 26. It is therefore possible to favorably protect the chest region B of the occupant M by the expanded chest protection portion 17.

Therefore, even if the airbag 11 of the embodiment has a configuration of adhering base cloths with threads of different thicknesses (thick thread base cloth 30, fine thread base cloth 31) to each other, it is possible to configure the external wall 12 while securing a favorable adhesion strength.

Further, with the airbag 11 of the embodiment, the coating layer 28 may be provided on only the thick thread base cloth 30 (lumbar region base cloth 25). Therefore, compared to the case that the coating layer is provided on both the lumbar region base cloth (thick thread base cloth) and the chest region base cloth (fine thread base cloth) and both the coating layers are melted, the formation process of the coating layer (application process of the coating agent) to the chest region base cloth (fine thread base cloth) becomes unnecessary, and it is possible to reduce the number of manufacturing processes.

In addition, with the airbag 11 of the embodiment, both the thick thread base cloth 30 and the fine thread base cloth 31 are formed of polyamide fibers and the coating layer 28 is formed by applying a polyamide-based elastomer emulsion. That is, within the airbag 11 of the embodiment, the airbag base cloth 24 (the thick thread base cloth 30 and the fine thread base cloth 31) that configures the airbag 11 and the coating layer 28 are formed of the same type of polyamide-based material. Therefore, if the airbag is divided into small pieces and melted or the like, the airbag can be easily used as a polyamide reclaimed material, which is favorable for recycling. Naturally, if such a point is not considered, the airbag base cloth and the coating agent may not be formed of the same material. For example, the airbag base cloth may be formed of polyester fibers or the like.

Here, with the airbag 11 of the embodiment, the coating layer 28 is formed only on a region in which the chest region base cloth 26 and the reinforcing cloth 27 overlap on the lumbar region base cloth 25. Naturally, the coating layer may be configured to be over the entirety of the lumbar region base cloth in order to prevent the leakage of gas from the lumbar protection portion.

Further, in the embodiment, description is given with an airbag of a side airbag apparatus as an example. However, an airbag to which the present invention is application is not limited thereto, and is application to an airbag for protecting the head region, an airbag for protecting the knee, and the like.

What is claims is:

1. An airbag comprising:
an external wall composed of a flexible woven cloth,
wherein the external wall is adhered and configured by extending a thick thread base cloth and a fine thread base cloth with threads of different thicknesses while performing heat pressing with a coating layer interposed between the thick thread base cloth and the fine thread base cloth, and
the coating layer is formed by applying a coating agent that forms the coating layer on the thick thread base cloth side in advance.

2. The airbag according to claim 1,
wherein the thick thread base cloth and the fine thread base cloth are both formed of polyamide fibers, and
the coating layer is formed by applying a polyamide-based elastomer emulsion.

3. An airbag comprising,
an external wall composed of a flexible woven cloth, wherein
the external wall is adhered and configured by extending a thick thread base cloth and a fine thread base cloth with threads of different thicknesses while performing heat pressing with a coating layer interposed between the thick thread base cloth and the fine thread base cloth,
the coating layer is formed by applying a coating agent that forms the coating layer on the thick thread base cloth side in advance,
the airbag is used for an airbag apparatus that is arranged on a side face on a vehicle outside of a seat back of a seat in the vehicle,
the airbag includes a lumber protection portion that protects a lumbar region of an occupant that sits on the seat when expansion is completed, and a chest protection portion that is arranged to an upper side of the lumber protection portion and that protects a chest region of the occupant,
the lumber protection portion is configured by the thick thread base cloth, and
the chest protection portion is configured by the fine thread base cloth.

4. A manufacturing method of an airbag comprising an external wall composed of a flexible woven cloth in which the external wall is configured by extending a thick thread base cloth and a fine thread base cloth with threads of different thicknesses,
wherein the external wall is formed by forming a coating layer by applying a coating agent on the thick thread base cloth and by adhering the thick thread base cloth and the fine thread base cloth by performing heat pressing by overlapping the fine thread base cloth on the coating layer.

5. The manufacturing method of the airbag according to claim 4,
wherein the thick thread base cloth and the fine thread base cloth are both formed of polyamide fibers, and the coating agent is composed of a polyamide-based elastomer emulsion.

6. The manufacturing method of the airbag according to claim 4,
wherein the coating layer is formed by screen printing.

7. The airbag according to claim 1, wherein the coating layer is interposed between the thick thread base cloth and the fine thread base cloth at an overlapping region where the thick thread base cloth overlaps the fine thread base cloth.

8. The airbag according to claim 1, wherein the coating layer is interposed between the thick thread base cloth and the fine thread base cloth only at an overlapping region where the thick thread base cloth overlaps the fine thread base cloth.

9. The airbag according to claim 1, wherein the coating layer extends into convexities and concavities of the thick thread base cloth and the fine thread base cloth.

10. The airbag according to claim 1, wherein the coating layer extends into convexities and concavities of the thin thread base cloth more than the coating layer extends into convexities and concavities of the thick thread base cloth.

* * * * *